United States Patent
Bonnet

(10) Patent No.: US 7,604,461 B2
(45) Date of Patent: Oct. 20, 2009

(54) ROTOR BLADE FOR A WIND TURBINE HAVING AERODYNAMIC FEATURE ELEMENTS

(75) Inventor: Laurent Bonnet, Mesum (DE)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 11/283,116

(22) Filed: Nov. 17, 2005

(65) Prior Publication Data

US 2007/0110585 A1     May 17, 2007

(51) Int. Cl.
*F03D 11/00* (2006.01)

(52) U.S. Cl. .............. 416/235; 416/236 R; 416/241 R

(58) Field of Classification Search ........... 416/228, 416/231 B, 235, 236 R, 241 R
See application file for complete search history.

(56) References Cited

U.S. PATENT DOCUMENTS

| | | | | |
|---|---|---|---|---|
| 1,758,560 A | * | 5/1930 | Currie | ............ 416/202 |
| 4,247,258 A | * | 1/1981 | Griffee et al. | ............ 416/230 |
| 4,706,910 A | * | 11/1987 | Walsh et al. | ............ 244/130 |
| 4,932,612 A | | 6/1990 | Blackwelder et al. | |
| 4,974,633 A | * | 12/1990 | Hickey | ............ 137/561 R |
| 5,114,099 A | | 5/1992 | Gao | |
| 5,540,406 A | * | 7/1996 | Occhipinti | ............ 244/200 |
| 5,542,630 A | | 8/1996 | Savill | |
| 5,820,943 A | * | 10/1998 | Huang | ............ 427/510 |
| 5,848,769 A | | 12/1998 | Fronek et al. | |
| 5,860,626 A | | 1/1999 | Moser | |
| 5,971,326 A | | 10/1999 | Bechert | |
| 6,092,766 A | | 7/2000 | LaRoche et al. | |
| 6,109,565 A | | 8/2000 | King, Sr. | |
| 6,193,191 B1 | | 2/2001 | Falcimaigne et al. | |
| 6,345,791 B1 | | 2/2002 | McClure | |
| 6,892,989 B1 | | 5/2005 | Whitmore et al. | |
| 6,923,624 B2 | * | 8/2005 | Tsai | ............ 416/231 B |
| 7,041,363 B2 | | 5/2006 | Krohmer et al. | |
| 7,070,850 B2 | | 7/2006 | Dietz et al. | |

* cited by examiner

*Primary Examiner*—Ninh H Nguyen
(74) *Attorney, Agent, or Firm*—James McGinness, Esq.; Armstrong Teasdale LLP

(57) ABSTRACT

A rotor blade for a wind turbine includes a surface having a plurality of aerodynamics feature elements formed therein. The elements for influencing an airflow at the surface during operation of the wind turbine and arrayed in a two dimensional pattern.

9 Claims, 19 Drawing Sheets

ROTOR BLADE FOR A WIND TURBINE HAVING AERODYNAMIC FEATURE ELEMENTS

BACKGROUND OF THE INVENTION

This invention relates generally to rotor blades for a wind turbine, and more specifically to the surface of a rotor blade for a wind turbine.

BRIEF DESCRIPTION OF THE INVENTION

Rotor blades are primary elements of wind turbines for the conversion of wind energy into electrical energy. The working principle of the rotor blades resembles that of airplane wings. A cross-section of a typical blade, during operation thereof, enables air to flow along both sides of the blade producing a pressure difference between the sides. Consequently, a lift force, which is directed from a pressure side towards a suction side, acts on the blade.

In addition, an attached-flow region has a mainly laminar flow along an outer surface area of the blade. In contrast, a detached-flow region in the wake of flow separation has a more turbulent flow. Flow separation depends on a number of factors, such as incoming air flow characteristics (e.g. Reynolds number, wind speed, in-flow atmospheric turbulence) and characteristics of the blade (e.g. airfoil sections, blade chord and thickness, twist distribution, pitch angle, etc).

The lift force is predominantly created in the attached-flow region, whereas the detached-flow region leads to an increase in drag force, mainly due to a pressure difference between the upstream attached-flow region and the downstream detached-flow region.

The force component used to produce electrical power is a portion of the lift force acting as torque on the rotor main shaft. Hence, in order to increase the energy conversion efficiency during normal operation of the wind turbine, it is desired to maximize the lift force. On the other hand, it is generally desired to minimize the drag force. To this purpose, it is advantageous to increase the attached-flow region and to reduce the detached-flow region by having the flow separation near a trailing edge of the blade, i.e. in a downstream region of the blade. Also, it is generally desired to have a stable flow separation, e.g. in order to increase the working stability or to decrease noise generation.

DETAILED DESCRIPTION OF THE INVENTION

Figure 1:
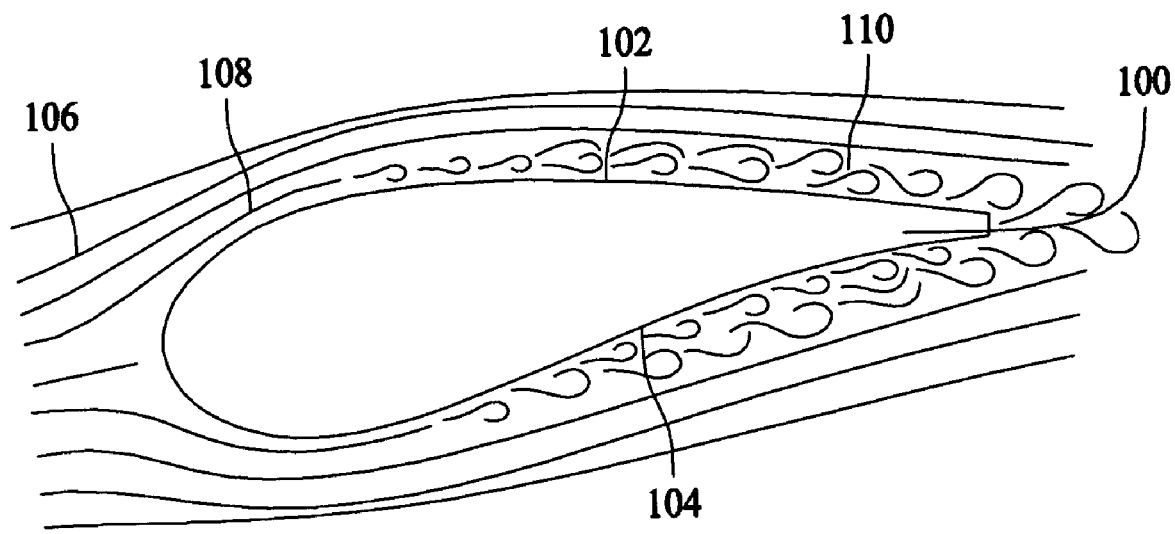
FIGS. 1 and 2 are cross-sectional views through a standard wind turbine blade.

FIG. 1 is a cross sectional view of a typical blade 100 including a suction side 102 and a higher pressure side 104. As illustrated by lines 106, air flows along both sides 102, 104 of blade 100. A pressure difference develops between sides 102, 104, such that side 102, which experiences a lower pressure, is a suction side, and side 104, which experiences a higher pressure, is a pressure side. Consequently, a lift force, directed from pressure side 104 towards suction side 102, acts on blade 100.

Also shown in FIG. 1 is a flow separation between a region of attached air flow 108, and a region of detached air flow 110. Attached-flow region 108 has a mainly laminar flow along an outer surface area of blade 100. In contrast, detached-flow region 110 in the wake of the flow separation has a more turbulent flow. Flow separation depends on a number of factors, such as incoming air flow characteristics (e.g. Reynolds number, wind speed, turbulence) and characteristics of the blade (e.g. blade thickness, pitch angle, etc).

Figure 2:
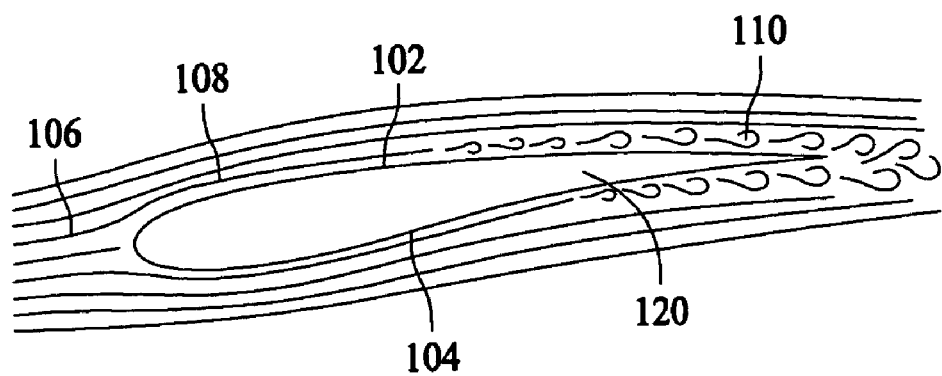

FIG. 2 is a cross sectional view of a blade 120 in which similar reference numbers indicate the same features as described in FIG. 1. Blade 120 includes a smaller pitch angle than blade 100 (shown in FIG. 1). Consequently, the region of flow separation in FIG. 2 is further downstream, i.e. closer to the blade's trailing edge, compared to the flow separation in FIG. 1.

Figure 3:
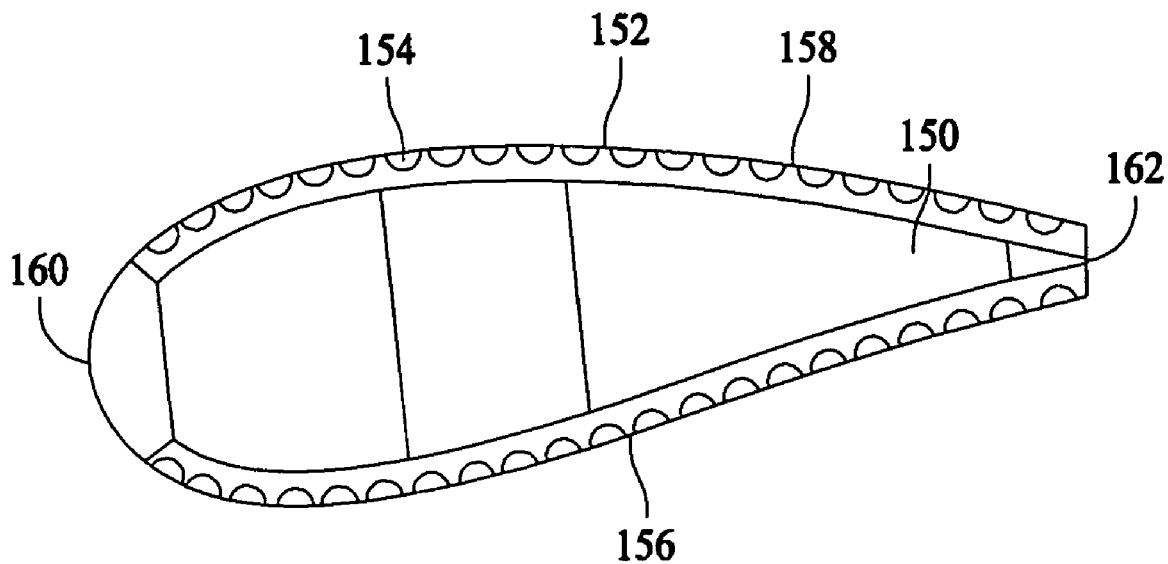
FIGS. 3 and 4 are cross-sectional views through a wind turbine blade having a dimple skin.
Figure 4:
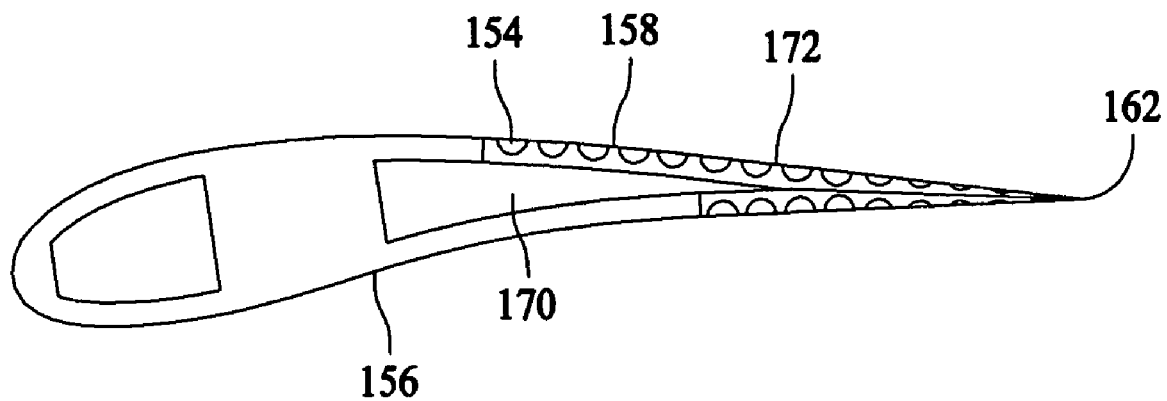

Referring to FIGS. 3 and 4, embodiments of the present invention are shown, which include dimples as aerodynamic feature elements on a surface of a blade. Dimples are also known in golf balls, where they are commonly used to improve the aerodynamic properties of the golf balls as a bluff body.

Specifically, FIG. 3 illustrates a cross section of a blade 150 including a surface 152 having aerodynamic feature elements 154 on both a pressure side 156 and a suction side 158 of blade 150. In the illustrated embodiment, surface 152 includes aerodynamic feature elements 154 on the entire blade, i.e. from a leading edge 160 to a trailing edge 162 on both sides of blade 150.

FIG. 4 illustrates a cross section of a blade 170 in which similar reference numbers indicate the same features as described in FIG. 3. As illustrated in FIG. 4, aerodynamic feature elements 154 are provided only on a trailing edge portion 172 of blade 170, i.e. between spar caps and a downstream trailing edge 162 of blade 170. In other embodiments, aerodynamic feature elements 154 may further be provided only on a leading edge portion 160 of blade 170, i.e. between the spar caps and an upstream leading edge (not shown). The latter arrangement may be useful for a thick or cylindrical section near or at the blade root. Other arrangements of aerodynamic feature elements on the blade surface are also possible, depending on the blade geometry and the desired blade characteristics. For example, the extension of the surface having aerodynamic feature elements depends, in one embodiment, on the radial position on the blade.

As is shown in FIGS. 3 and 4, aerodynamic feature elements 154 are be provided integrally with a skin sheet. Hereby, the aerodynamic feature elements are defined as a height profile of the surface of the skin sheet. In the embodiments shown in FIGS. 3 and 4, surface 152 defines a smooth surface area, into which aerodynamic feature elements 154 are immersed, i.e. from which aerodynamic feature elements are extending in an inwardly direction.

Aerodynamic feature elements 154 in the embodiment shown in FIGS. 3 and 4 all have the same shape, size, and arrangement. However, in other embodiments given the different airfoil section size, local air flow speed and Reynolds number, it may be desirable to provide aerodynamic feature elements that vary in shape, size, arrangement, and/or orientation, depending on the position on blades 150, 170. For example, aerodynamic feature elements 154 can be very large (having a length between 0.3 m and 10 m and a width and depth each between 0.3 cm and 5 cm) at the root section and very small at the tip region (having a length, width and depth each between 0.3 mm and 5 mm).

The above variation aerodynamic feature elements 154 can be continuous or stepwise. Further, the variation can be in a radial, in a circumferential, or in some other direction of the blades 150, 170. Further, aerodynamic feature elements 154 can be different on pressure side 156 and on suction side 158 of blades 150, 170.

Figure 5:
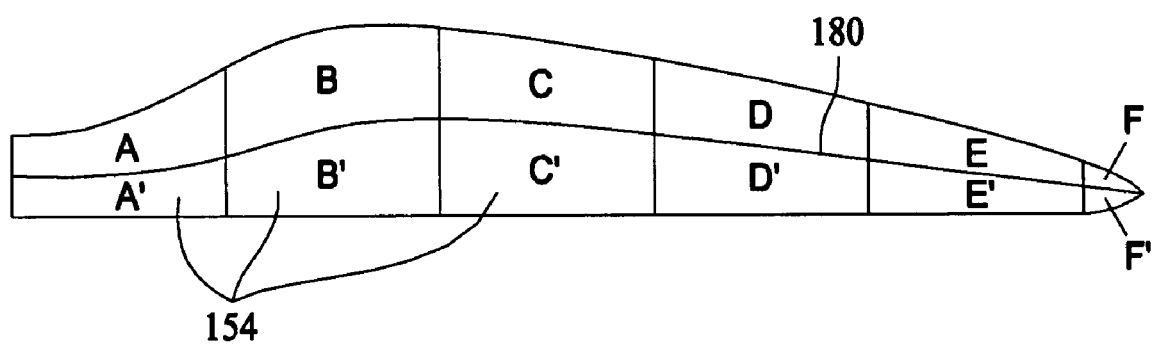
FIG. 5 is a top view of a blade having different surface sections, e.g. with differently sized dimples.
Figure 6:
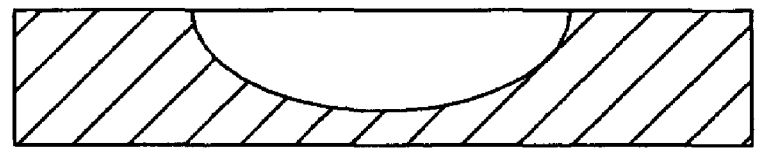
FIGS. 6 through 13 are enlarged views of dimple skins having different dimple size and depth.
Figure 7:
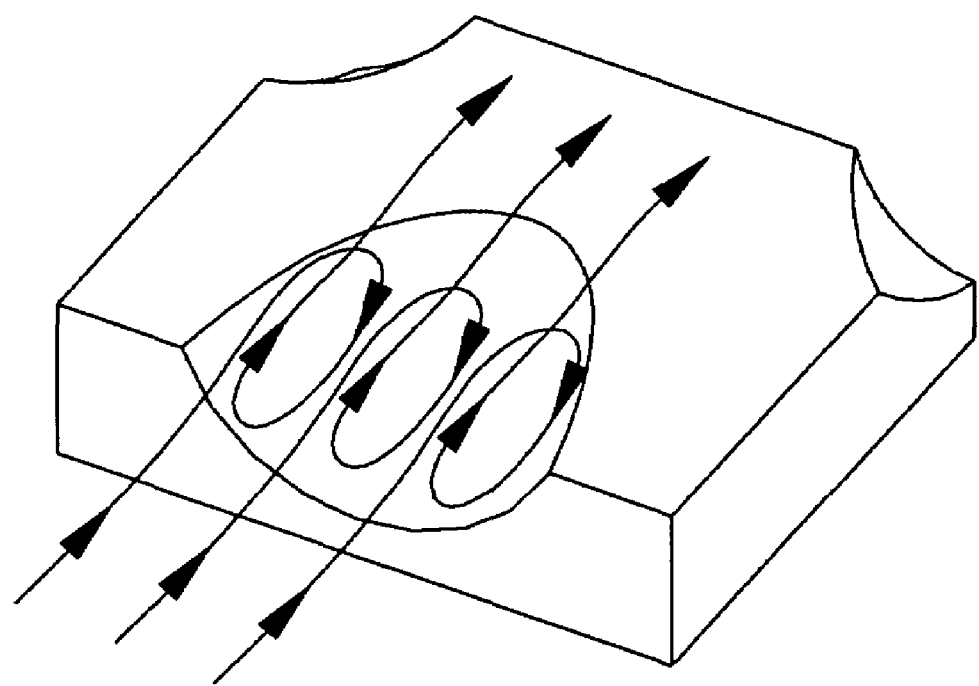
Figure 8:
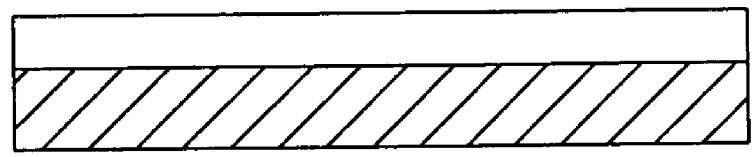
Figure 9:
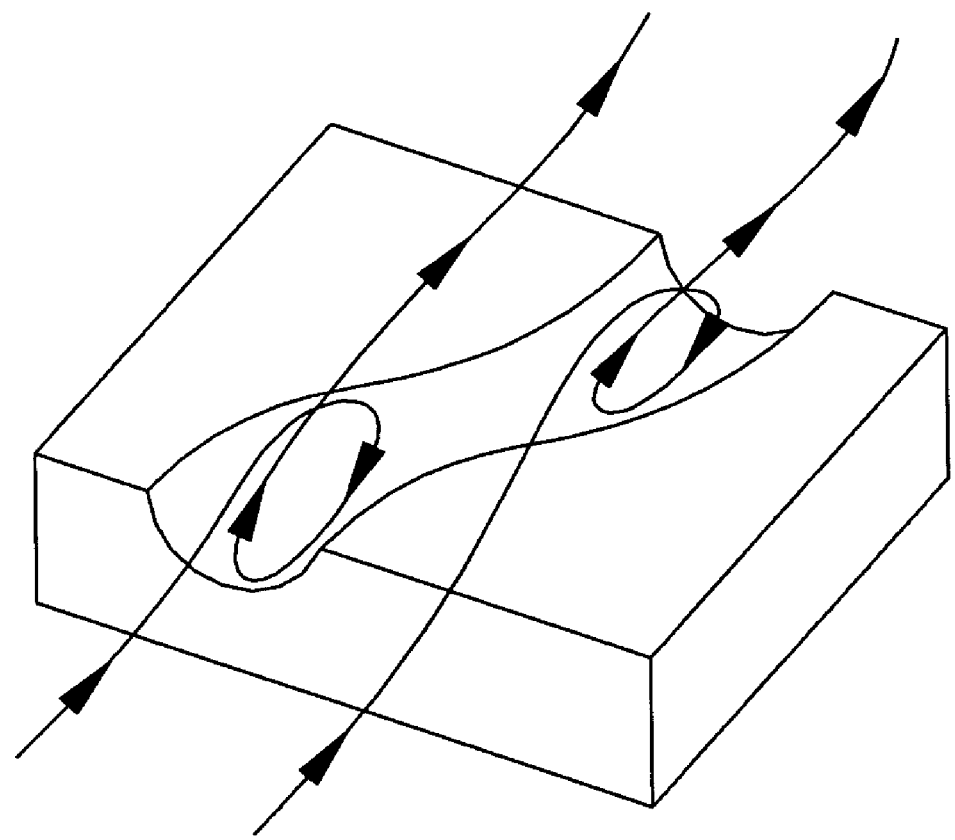
Figure 10:
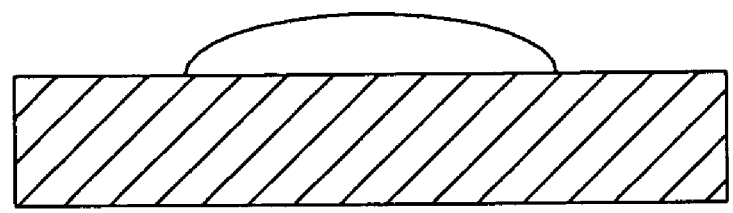
Figure 11:
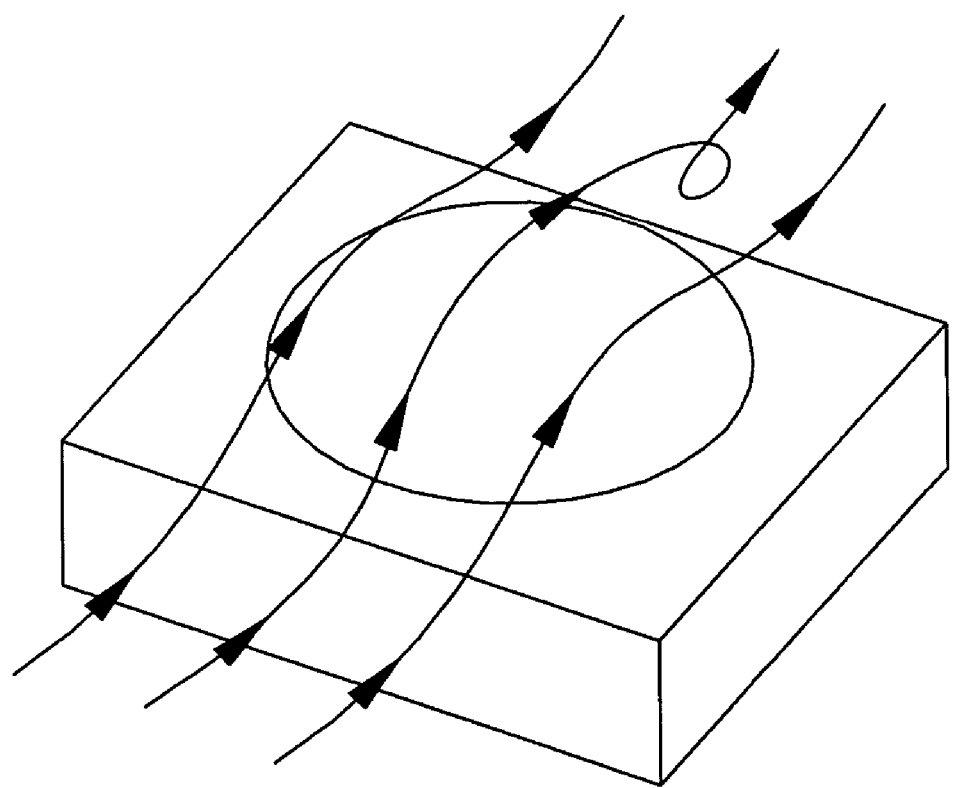
Figure 12:
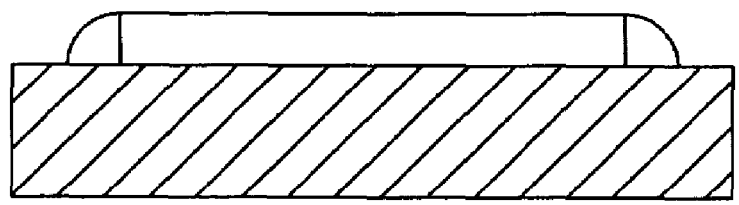
Figure 13:
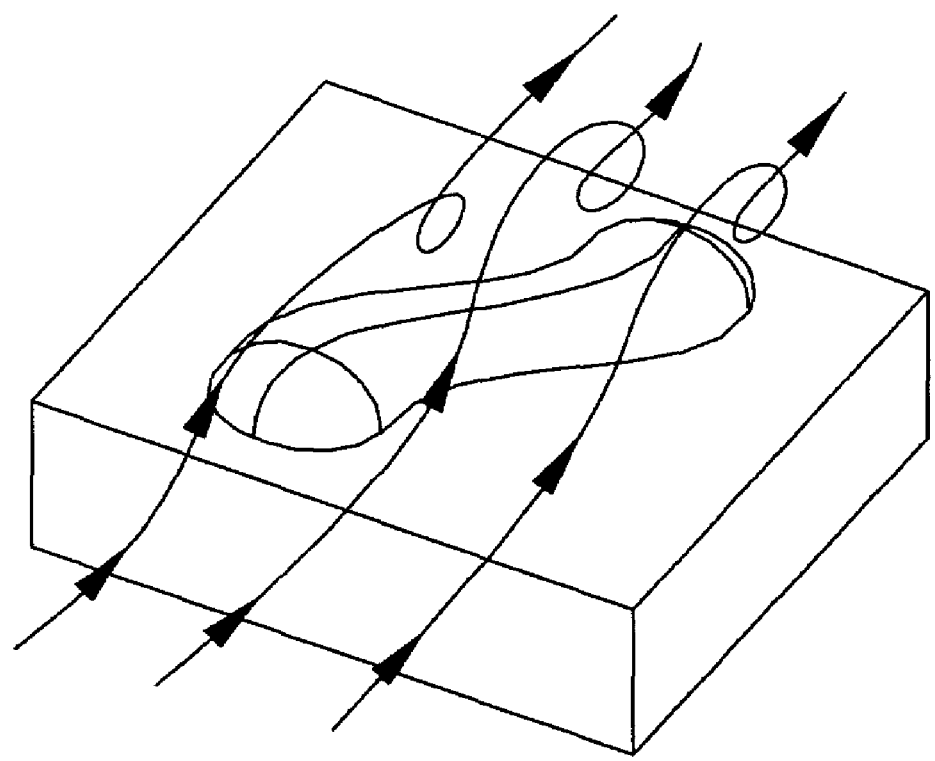

An example for a stepwise variation of aerodynamic feature elements 154 is illustrated in FIG. 5. As shown in FIG. 5, a blade 180 has several aerodynamic feature element surfaces A to F and A' to F', whereby each of the surfaces may include aerodynamic feature elements 154 of a particular shape, size, arrangement and/or orientation. Thus, a stepwise variation of aerodynamic feature elements 154 is achieved.

In this way, a difference in air flow velocities and other air flow conditions between the respective blade sections can be accounted for. Further, aerodynamic feature elements 154 may serve different purposes in the respective sections. For example, surfaces A to C and A' to C' may mainly promote flow transition stability in a region of comparably low blade velocity. On the other hand, surfaces D to F and D' to F' may mainly serve to extend flow transition as far downstream as possible in a region of comparably high blade velocity, in order to reduce drag. In FIG. 5, aerodynamic feature elements surfaces D to F and D' to F' are provided along the outmost 50% of the blade span in order to extend flow transition as far as possible to the trailing edge in order to reduce drag. Further, the use of areas having differently shaped or sized aerodynamic feature elements 154 may serve to trigger a progressive flow transition, especially at high pitch angle.

Aerodynamic feature elements 154 on the different aerodynamic feature elements surfaces of FIG. 5 may differ in various respects. As a first example, the size of the aerodynamic feature elements may be varied. For example, surface A may include large, deep aerodynamic feature elements, whereas surfaces B to F may include aerodynamic feature elements of increasing extension and depth. Further, surfaces A' to F', which are located near a leading edge portion of blade 180, may be smaller than corresponding surfaces A to F on a trailing edge portion of blade 180 to be adapted to the generally more laminar air flow near the leading edge.

For example, aerodynamic feature elements 154 on surface A may be smaller in each direction by a respective factor of one half to one tenth than those on surface F, whereas aerodynamic feature elements 154 on surfaces B to E have intermediate sizes. For example, the elements on surface F may have a maximum extension along the surface of 1 to 10 cm and a maximum depth of 0.1-1 cm, whereas surface A may have elements having a maximum extension along the surface of 1 to 10 mm and a maximum depth of 0.1-1 mm. Thereby, the skin F comprising aerodynamic feature elements 154 may be relatively thin (e.g. having an outer layer about 1 mm thick), and skin A may be thicker (e.g. having an outer layer about 4 mm thick). Alternatively, both dimple skins A and F may be of the same thickness. In both cases, the bottom surface of e.g. a dimple skin may have the shape of the bottom of the dimples, or it may be smooth.

In order to have a continuous cross-over between a surface area having comparably large elements and a surface area having comparably small elements, it is also possible to have elements of different sizes on one surface.

As a second example, the shape of aerodynamic feature elements may be varied. Examples for a variation in shape are shown in FIGS. 6-13. As described herein, any embodiment of FIGS. 6-13, may correspond to any aerodynamic feature elements surface of FIG. 5. As shown in FIGS. 6-13, each shape is adapted to a particular air flow characteristic. For example, elongated structures in FIGS. 8, 9, 12 and 13 are adapted to a preferred overall air flow direction, whereas circular shapes, such as shown in FIGS. 5, 6, 7, 10 and 11 do not have a preferred air flow direction. Further, the immersed structures of FIGS. 6-9 tend to induce micro-turbulent flow within the immersed cavities, whereas the protruding elements of FIGS. 10-13 tend to induce micro-turbulent flow in the wake of the elements. Therefore, it can be advantageous to form the latter elements in an asymmetric pattern that distinguishes between a generally upstream and a generally downstream region of each element (not shown).

As a third example, the aerodynamic feature elements on each of the surfaces A to F and A' to F' of FIG. 5 may be the same. The advantage of this structure is that the blade skin needs not be made from a single-piece skin sheet, but can also be made from a plurality of skin sheet sections. Hereby, the skin sheet sections can have the form of tiles and can be applied in a tile-like fashion on the blade or on part of the blade. The number of tiles is not limited to 2×6 tiles as shown in FIG. 5, nor is the tiling limited to a quadratic tiling, but the skilled person will recognize that there are various ways of tiling a blade surface or part of a blade surface using aerodynamic feature element surfaces.

In other embodiments (not shown), different aerodynamic feature element surfaces may be used on the suction side and on the pressure side of the blade. Hereby, the term "different" can e.g. signify that the shape, size, arrangement, or orientation of the aerodynamic feature elements may be different. Further, more or less than 2×6 tiles or aerodynamic feature element surfaces may be provided. Further, the aerodynamic feature element characteristics may be varied in any direction within one surface. In a further embodiment, there are variations in the arrangement and/or the orientation of the aerodynamic feature elements.

It is typically desired to influence the flow separation behaviour. To this end, a region of potential flow separation should, if possible, be covered with aerodynamic feature elements. It can further be desired to improve the aerodynamic and noise performance at the root region of the blade, which is usually characterized by having a thick airfoil and a low local flow velocity. To this end, it may be advantageous to provide large aerodynamic feature elements near the root region, such as to energize sooner a stable turbulent boundary layer.

In the tip region, on the other hand, which is characterized by thin airfoils and a high local flow velocity, the priorities may be different. For example, here it may be desired to effectively restrict frictional drag but still stabilize the flow separation and other flow behaviour. This may lead to an improved aerodynamic and noise performance over a large operating domain (e.g. pitch, rotor speed). Therefore, the size of the aerodynamic feature elements should not be too large, such as to limit the frictional drag due to induced turbulences. Analogously, the use in other parts of the blade should be made dependent on a number of further factors, such as the relative importance of the frictional drag.

The aerodynamic feature elements surface is typically a polymeric skin sheet. In one embodiment, it comprises a hard polymer compound. In another embodiment, a thermoplastic ionomeric resin is used as a polymer compound, such as, for example, "Surlyn", produced by Dupont (see U.S. Pat. No. 4,884,814), or "Escor" and "Iotek", produced by Exxon (see U.S. Pat. No. 4,911,451). In the exemplary embodiment, the surface is manufactured from pre-moulded material and may have a pattern curved shell, which is typically similar to a composite sandwich. Its outer layer thickness is typically about 1-4 mm for a normal blade length. For large blades, i.e. a blade span of more than 50 m, the skin thickness is scaled accordingly by a scale factor. In most cases, the blade span divided by 50 m is used as scale factor.

The aerodynamic feature elements may be arranged in a variety of two-dimensional and three-dimensional patterns.

Exemplary patterns include hexagonal, rectangular, quadratic, body-centred quadratic, and other regular patterns. Further, it is possible to arrange the dimples in a random irregular pattern. The patterns can be cyclic or acyclic. The random arrangement is isotropic in the sense that no direction is preferred.

Although dimples were mainly used as examples in the above description, other aerodynamic feature elements can be used in a similar manner. These other elements can be defined by their height profile in the aerodynamic feature element surface. A number of such elements are illustrated in FIGS. 14-31. Hereby, it is possible to distinguish elements protruding outwardly from the surface and elements immersed inwardly into the surface. The terms "protruding" and "immersed" are used with respect to a smooth surface area defined by the surface between the aerodynamic feature elements.

Figure 14:
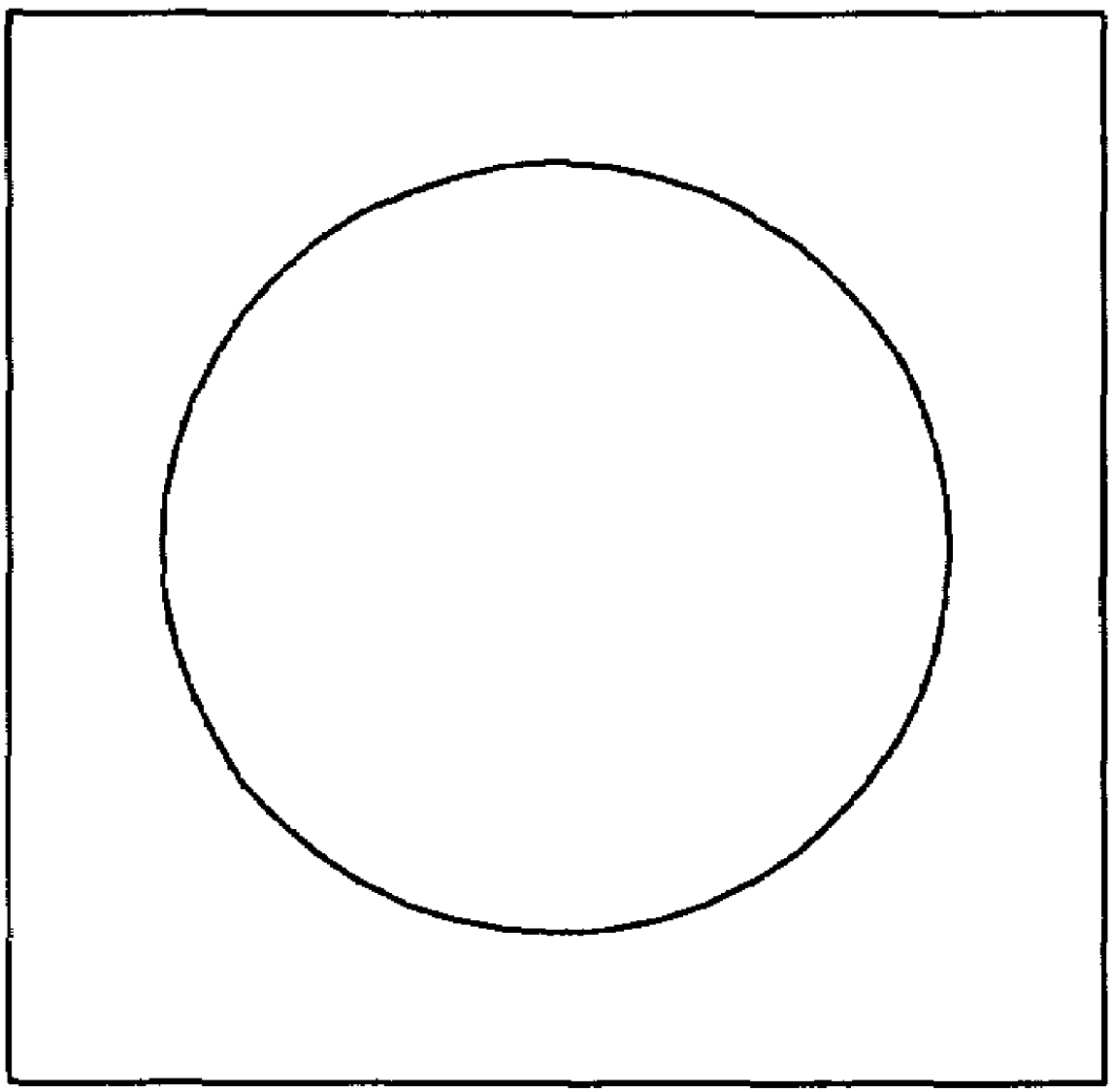
FIGS. 14 through 31 are top views of examples of aerodynamic feature elements immersed inwardly into the blade surface or protruding outwardly from the blade surface.
Figure 15:
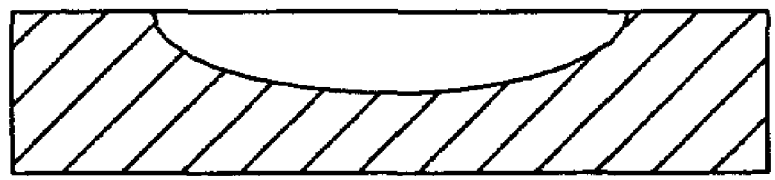
Figure 16:
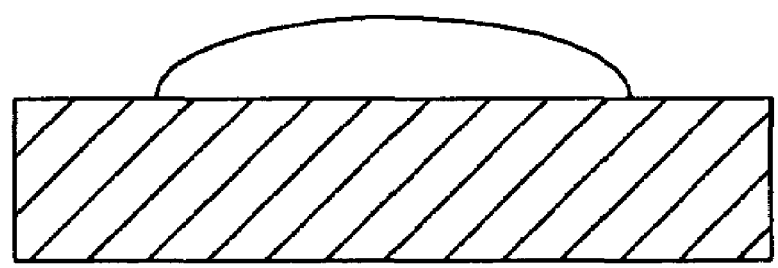
Figure 17:
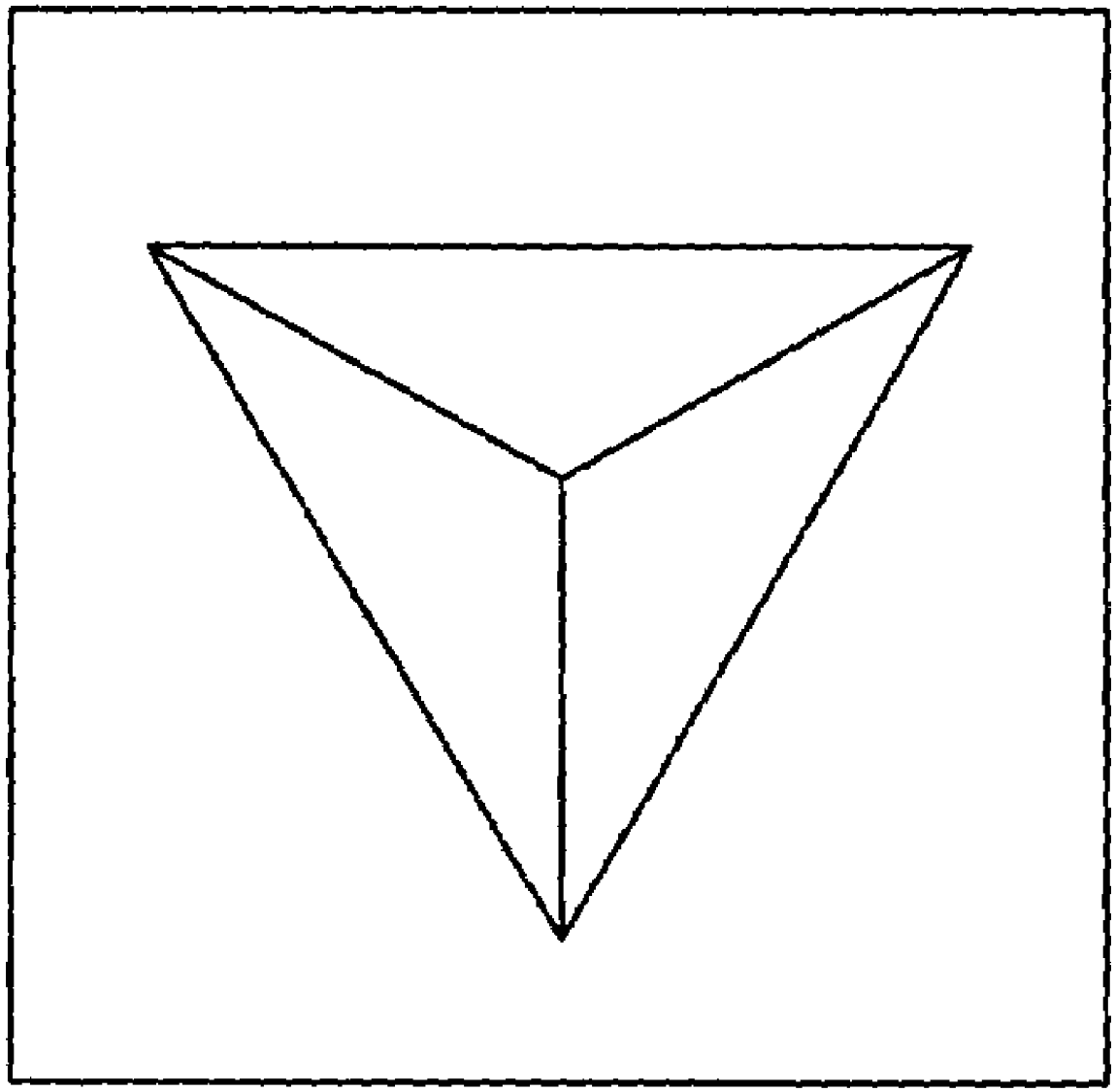
Figure 18:
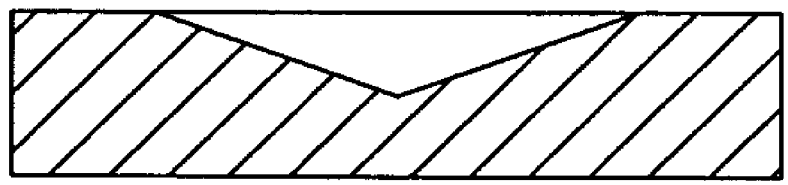
Figure 19:
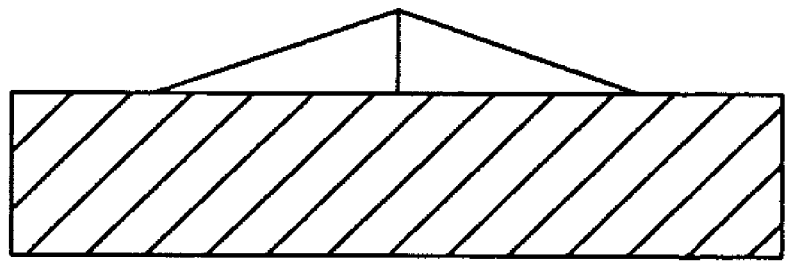
Figure 20:
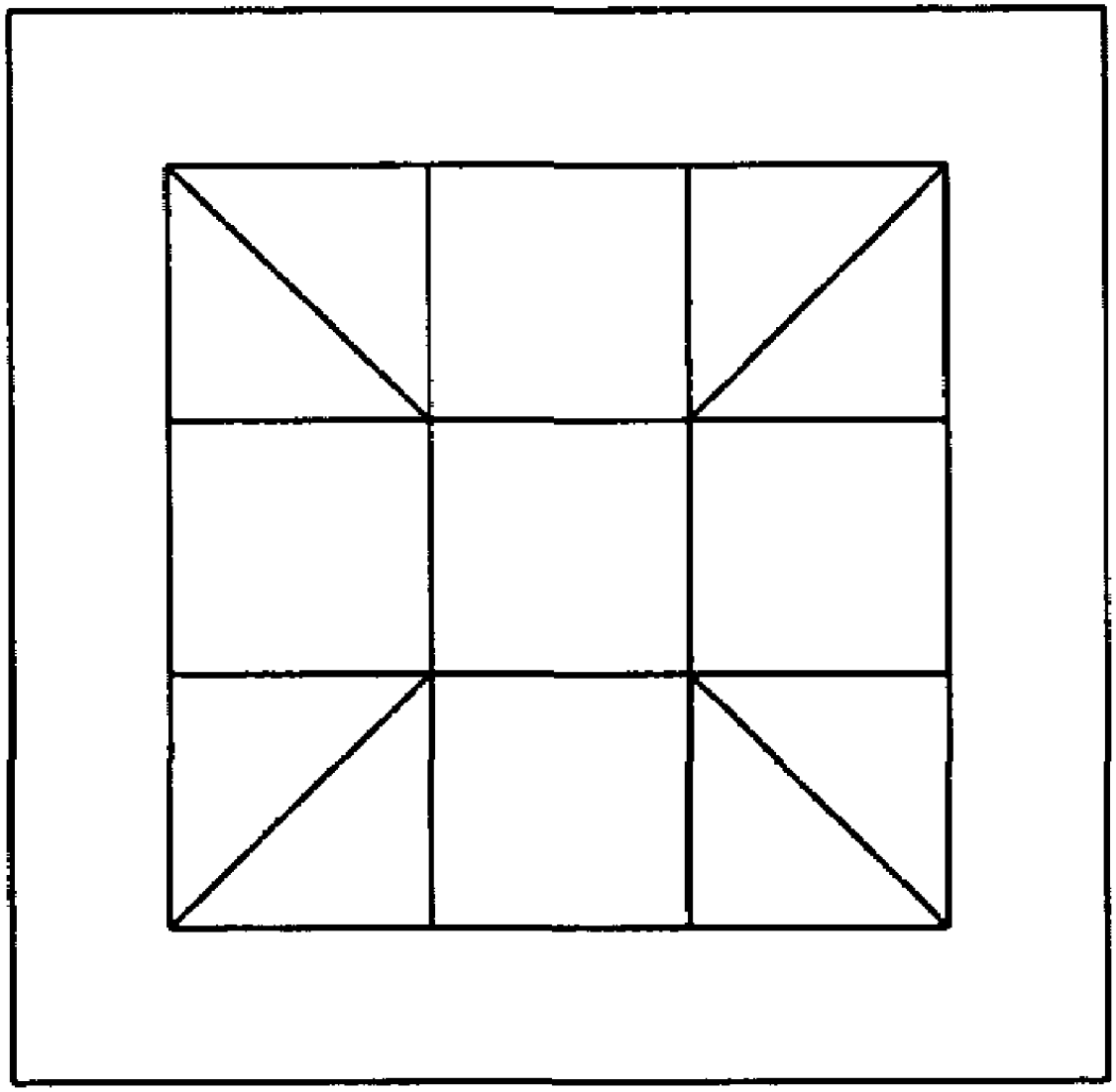
Figure 21:
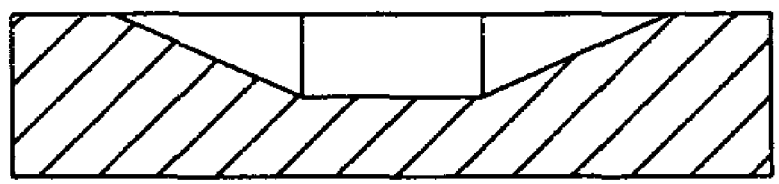
Figure 22:
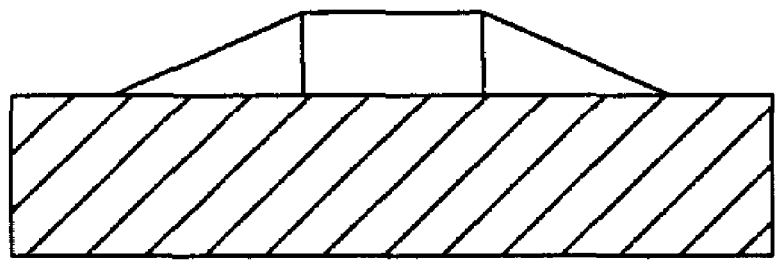
Figure 23:
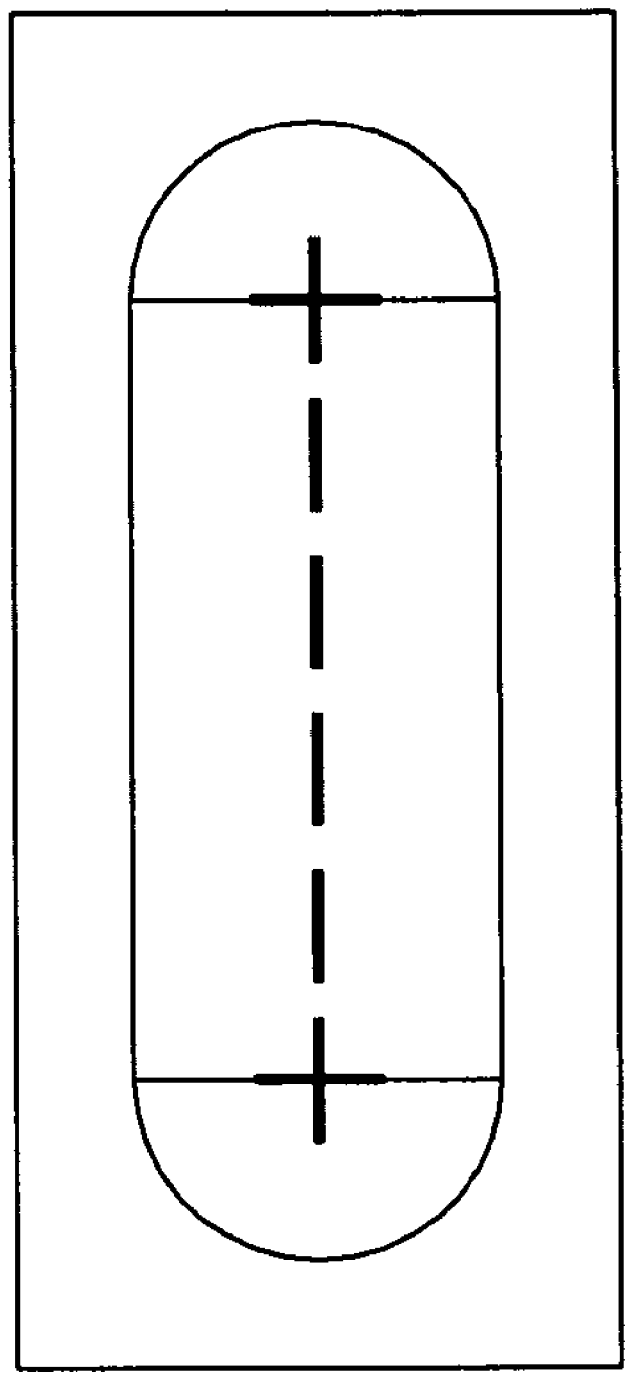
Figure 24:
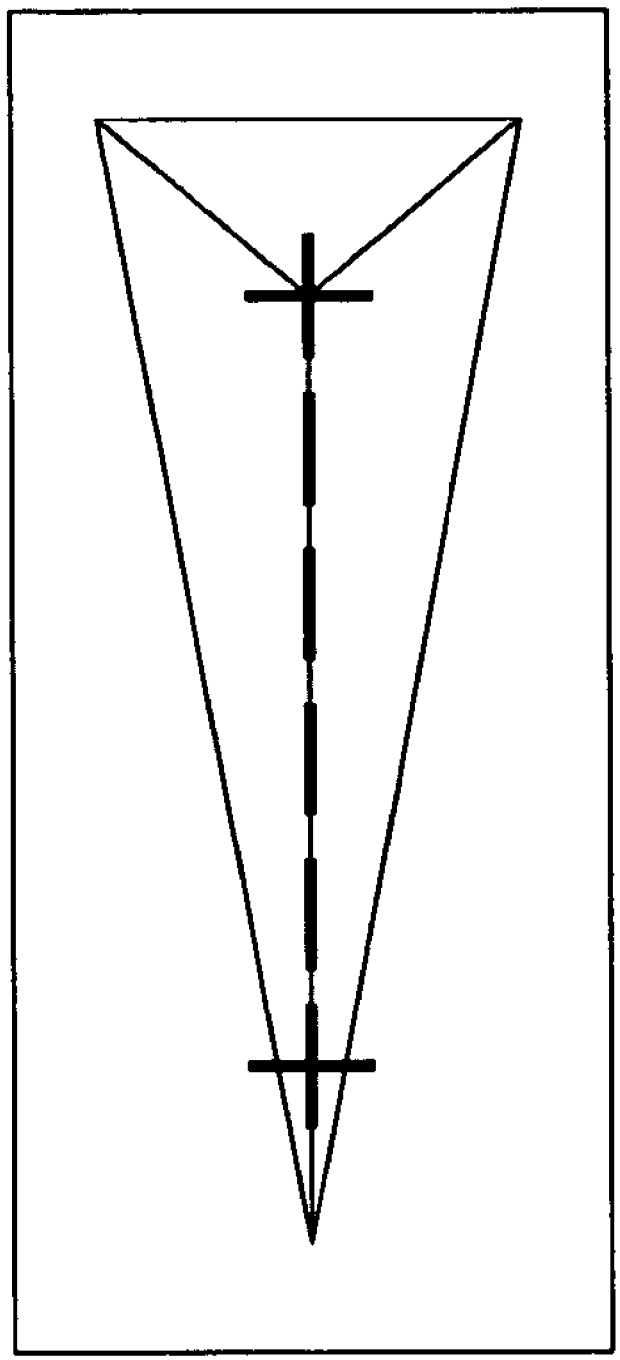
Figure 25:
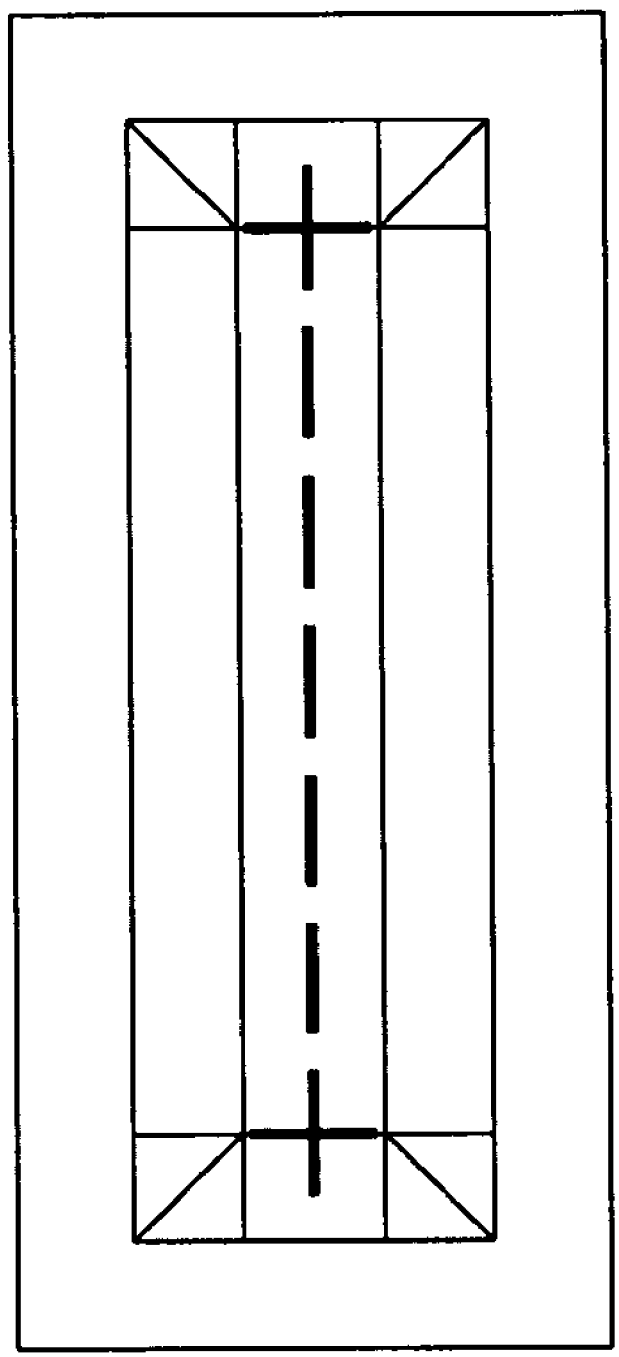
Figure 26:
Figure 27:
Figure 28:
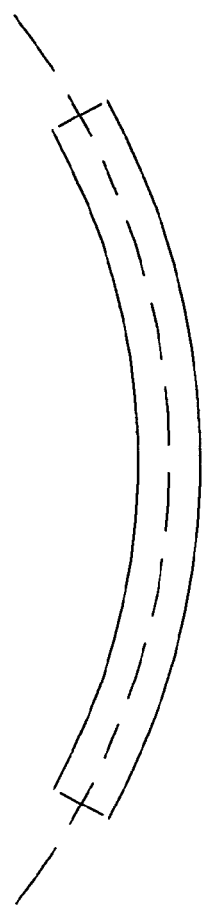
Figure 29:
Figure 30:
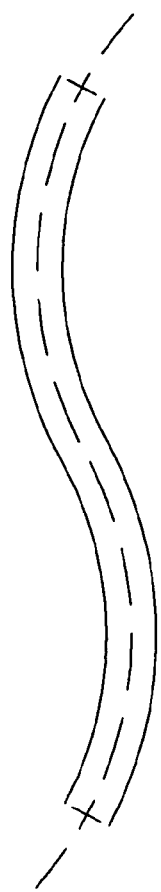
Figure 31:
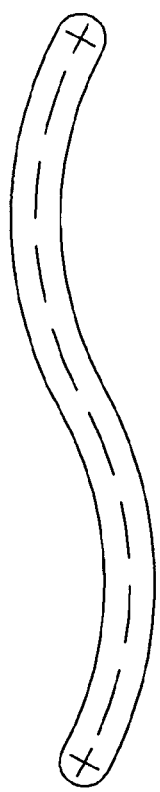

FIGS. 14-31 display examples of aerodynamic feature elements. The aerodynamic feature elements are either immersed inwardly into the surface or protruding outward from the surface. FIGS. 14, 17, and 20 illustrate the slope of each element, FIGS. 15, 18, and 21 illustrate the elements immersed inwardly and FIGS. 16, 19, and 22 illustrate the elements protruding outwardly. FIGS. 23-31 illustrates elongated slots. As is shown in FIGS. 23-25, the slots have either rounded or sharp edges and can be symmetric or asymmetric. In addition, they have various shapes and cross-sections. The embodiments illustrated in FIGS. 26-31, include slots that have a straight, a curved, multiple curvatures, or a zig-zag form (similar to a magnified groove of a vinyl record). The slots, or grooves, are to be open-ended or closed-ended. In addition, the slots are straight faceted edge slots and curved rounded edge slots.

FIGS. 16, 19, and 22, illustrate a section of an outward spherical shape, polygonal shapes, and rounded polygonal shapes. FIGS. 23-31 illustrate ribs that correspond to the above description of the slots, the difference being that the ribs are outwardly protruding from the surface.

Other embodiments of intrusions that are suitable as aerodynamic feature elements include pores, inverted cones, and grooves. The grooves include, for example, a U-shaped or a V-shaped vertical cross-section. Further examples for protrusions are shark teeth, pyramids, cones, hemispherical sections, fins and ribs. The ribs include, in one example, a vertical cross-section shape as an inverse U or an inverse V.

Further, the aerodynamic feature elements may be asymmetrically deformed or otherwise anisotropic and thus may have a designated orientation, e.g. an upstream side and a downstream side. Examples for aerodynamic feature elements having a designated orientation include shark teeth and wave-type elements (i.e. asymmetrically deformed ribs). For example, the wave-type elements are arranged having a long side along a direction of air flow or orthogonal to a direction of air flow.

If arranged in a suitable way, the use of anisotropic elements can be a way of adapting the aerodynamic feature elements to an anticipated air flow direction. Further, it may have an effect of directing the air flow along the blade surface. This can have further advantageous effects on the overall air flow. For example, large-scale laminar flow along a defined direction on the blade surface may be promoted. This can lead to a decrease of noise production.

Further, elements having sharp or rounded edges can be used. Further, other elements are within the scope of the present invention, e.g. elements comprising both protruding and immersed portions. Generally, the aerodynamic feature elements can be characterized, among others, in terms of positive or negative cavity, cavity curvature, cavity facets, sharp or rounded edges, random or cyclic pattern layouts, and isotropic or anisotropic shape.

The aerodynamic feature elements shown in FIGS. 6-31 have a similar effect as the dimples described above, namely to influence the air flow near the boundary layer at the blade surface. Therefore, aerodynamic feature elements formed to correspond to the above description, but in which the dimples are replaced by other aerodynamic feature elements such as the ones shown in FIGS. 6-31.

While the invention has been described in terms of various specific embodiments, those skilled in the art will recognize that the invention can be practiced with modification within the spirit and scope of the claims.

What is claimed is:

1. A rotor blade for a wind turbine, said rotor blade comprising a first surface having a plurality of first aerodynamic feature elements formed therein and a second surface having a plurality of second aerodynamic feature elements formed therein, said first aerodynamic feature elements influencing an air flow at said first surface during operation of the wind turbine and arranged in a three-dimensional pattern, and wherein said first aerodynamic feature elements in a root region of said blade are larger than said first aerodynamic feature elements in a tip region of said blade by at least 10% in at least one dimension of said first aerodynamic feature elements, said second aerodynamic feature elements influencing an air flow at said second surface and arranged in a two-dimensional pattern, wherein said first aerodynamic feature elements have at least one of a shape, a size, and an arrangement different than at least one of a corresponding shape, size and arrangement of said second aerodynamic feature elements.

2. The rotor blade according to claim 1 wherein said first surface defines a smooth surface area and said plurality of first aerodynamic feature elements are inwardly recessed in the surface area.

3. The rotor blade according to claim 2 wherein said plurality of first and second aerodynamic feature elements are formed as, or as parts of, at least one of: spherical cavities, rounded polygonal cavities, straight faceted edge slots, curved rounded edge slots, and multiple curvatures rounded edge slots.

4. The rotor blade according to claim 1 wherein said first surface defines a smooth surface area and said plurality of first aerodynamic feature elements are outwardly protruding from the surface area.

5. The rotor blade according to claim 4 wherein said plurality of first and second aerodynamic feature elements are formed as, or as parts of, at least one of: spherical shapes, rounded polygonal shapes, straight faceted edge ribs, curved rounded edge ribs, and multiple curvatures rounded edge ribs.

6. The rotor blade according claim 1 wherein each of said first and second aerodynamic feature elements has at least one of a maximum extension in at least one direction along said surface of 10 centimeters and/or a maximum extension in a direction orthogonal to said surface of 1 centimeter.

7. The rotor blade according to claim 1 wherein each of said first and second aerodynamic feature elements has at least one of a minimum extension in at least one direction along said surface of 1 millimeter and a minimum extension in a direction orthogonal to the surface of 0.1 millimeter.

8. The rotor blade according to claim 1 wherein at least one of said first surface and said second surface is a coating surface comprising a hard polymer compound.

9. The rotor blade according to claim 1 wherein at least one of said first surface and said second surface is a molded fiberglass reinforced plastic construction comprising surface aerodynamic elements.

* * * * *